April 14, 1970    J. T. PETIT, JR    3,506,344
OPTICAL PROJECTION SYSTEM
Filed July 8, 1968    5 Sheets-Sheet 5
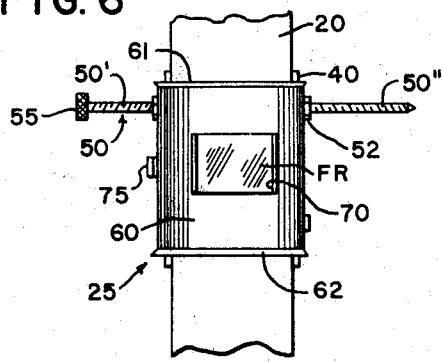
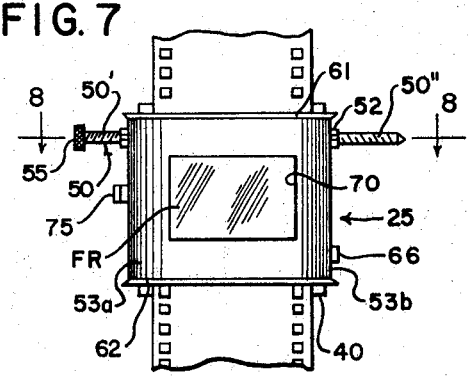
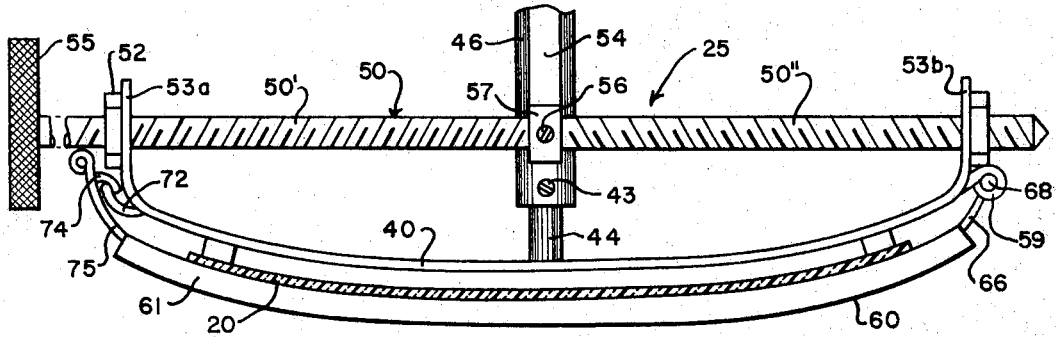
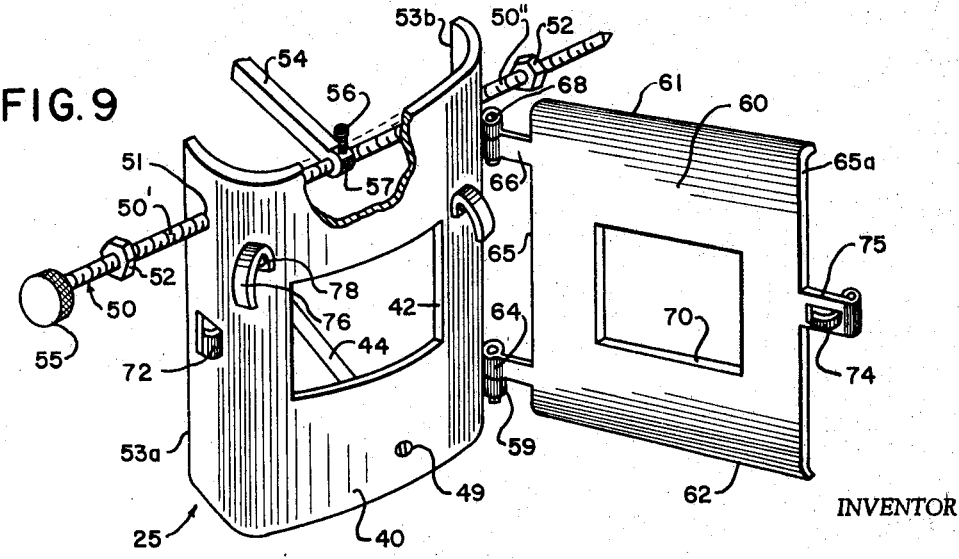
INVENTOR
Joseph T. Petit Jr.
BY Polachek & Saulsbury
ATTORNEYS.

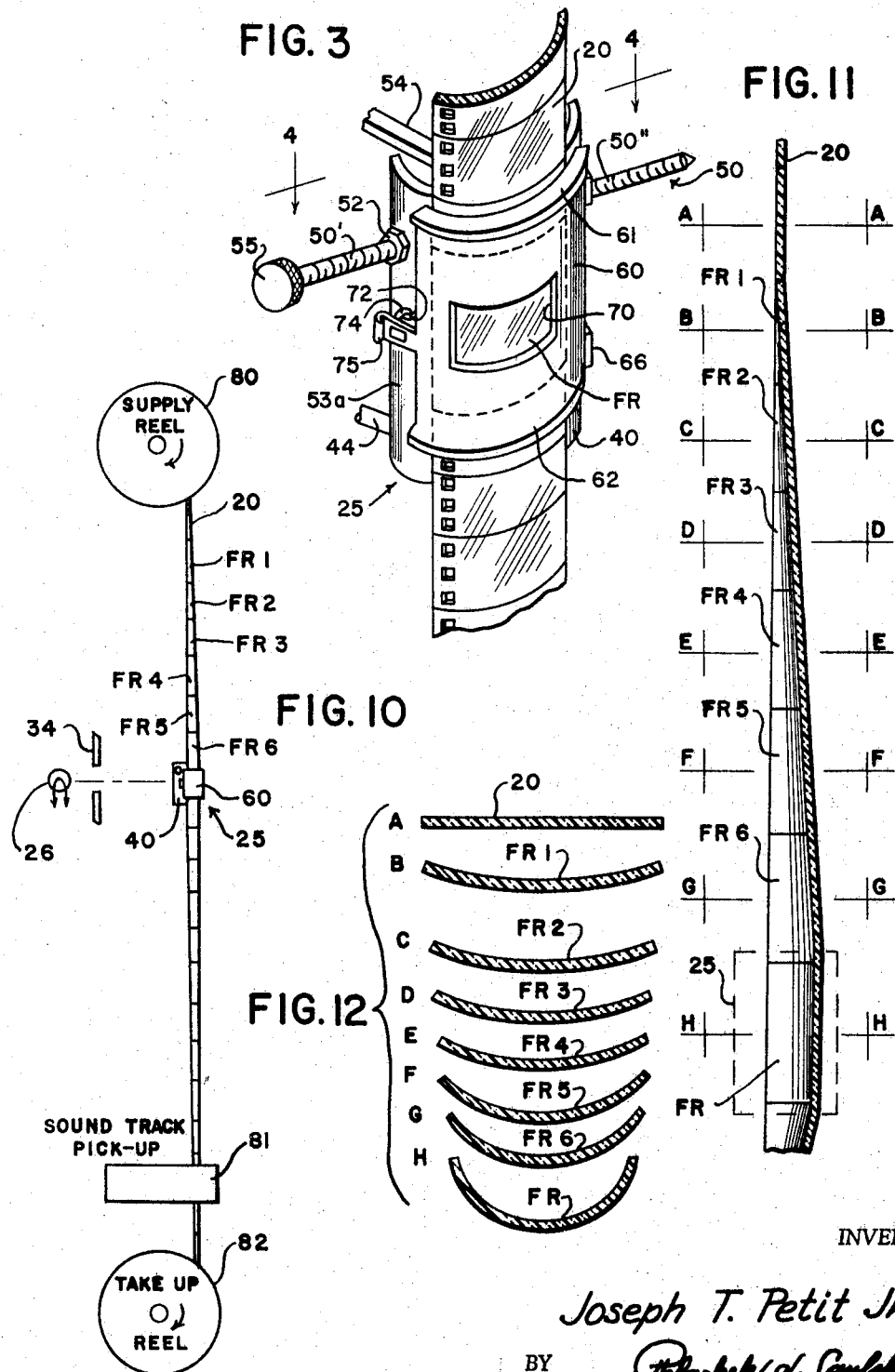

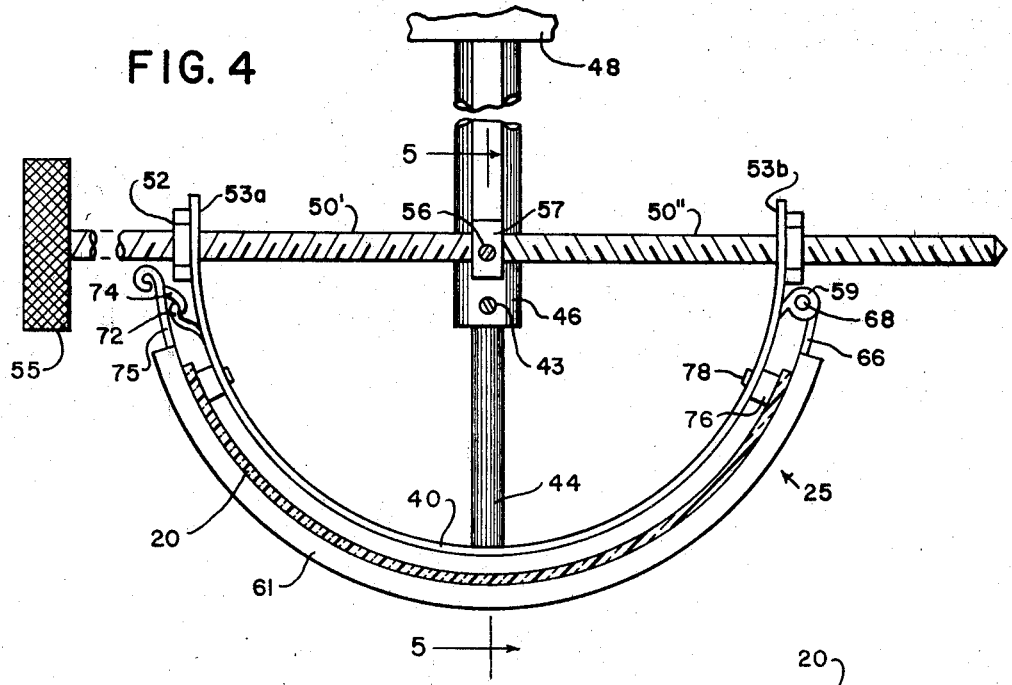

United States Patent Office 3,506,344
Patented Apr. 14, 1970

3,506,344
OPTICAL PROJECTION SYSTEM
Joseph T. Petit, Jr., N. Bernstein Blvd., P.O. Box 1244, Center Moriches, N.Y. 11934
Substituted for abandoned application Ser. No. 483,236. This application July 8, 1968, Ser. No. 767,009
Int. Cl. G03b 21/32, 37/00
U.S. Cl. 352—69                                                                                    7 Claims

ABSTRACT OF THE DISCLOSURE

The system includes a wide screen generally cylindrically curved. A curved film gate which is adjustable as to curvature, is provided for supporting the film in a cylindrically curved configuration corresponding to the curvature of the screen. A projection lens is interposed between the film and screen in an optical path for projecting the picture on the screen, said lens being anamorphotic if the film was photographed with anamorphotic apparatus.

---

This invention relates to an optical projection system for projecting images from standard motion picture film or still film in a wide angle upon a wide, curved screen.

The angle of projection may range from 120° to 180°. Many wide angle projection systems have come into current usage. Most of these systems employ enamorphosing lenses which compress filmed scenes only in the horizontal plane, to result in images which have normal height proportions but laterally compressed or squeezed horizontal dimensions. The film prints have standard sizes such as 70, 35, 16 or 8 millimeters. The anamorphotic image is projected in a projector from the film print through an anamorphosing projection lens which reverses the optical compression process and expands the compressed image to its original horizontal proportions on to a wide viewing screen. The known wide angle projection systems provide a more panoramic sweep of the picture than is obtained from films having uncompressed images projected upon narrower flat screens. Unfortunately the images on the wide angle screen lack depth, i.e. they appear flat. They lack the essential quality which is necessary to appear three dimensional and thoroughly realistic.

Other systems have been proposed to supply a three dimensional quality. Such systems are quite complex. One well known system requires three accurately synchronized cameras and projectors. Extreme care must be taken to avoid objectionable overlap of images. Any relative vertical oscillations of the images cast by the three projectors are readily apparent and destroy the illusion of realism. Such multiple projection systems are very costly, are difficult to operate and require special screens and theaters for satisfactory exhibition. Still other systems have been proposed employing fractionated projection lenses which bend, curve or twist the projected images. Such systems cause relative loss of light and result in poor quality of the resulting images.

The present invention is directed at overcoming the above and other disadvantages and difficulties by making use of standard film to cast a three-dimensional appearing image upon a screen, wherein the projection angle may range from 120° to 180°. The invention preferably employs film photographed and projected by anamorphotic apparatus but is adapted to employing film photographed with standard non-compressing lenses. By changing an anamorphosing projection lens to a standard non-anamorphosing lens, images can be projected on conventional wide or narrow screens from standard film prints.

The present invention employs a curved screen with a lenticular type surface so when the screen is curved, the reflected picture is of the same overall brightness. The radius of curvature and angular width of the screen depends on the size of the stage and auditorium in which the screen is installed. While a curved screen extending a full 180° in angular width is preferred the invention can be used with a curved screen ranging anywhere between 120° and 180° with full effectiveness. This will give projected images an illusion of depth or third dimensional quality without the flatness, fuzziness, image oscillation, distortion and other objectionable characteristics of other systems.

According to the invention, the film projector has a projection gate which is curved to curve the film extending therethrough. The curvature of the gate and film corresponds to the curvature of the projection screen. The result to produce images which are clear, sharp, undistorted and in focus but to the lateral edges of the wide, curved screen. The images appear three dimensional. They have a panoramic sweep and grandeur and they appear truly realistic.

The gate is adjustable in curvature so that the film being projected can be curved to correspond with any curvature of screen. The system can be quickly converted from wide angle curved screen projection employing anamorphotic film to narower angle flatter screen projection using standard non-anamorphotic film with non-anamorphosing lenses.

It is therefore one object of the invention to provide a film projection system employing a wide curved projection screen.

Another object is to provide a film projection system employing curved film to project images on a cylindrically curved screen, the screen ranging in curvature from 120° to 180° and the film being correspondingly curved at the point of projection.

A further object is to provide a film projection system as described wherein a cylindrically curved gate is used to shape the film to proper curvature to correspond with the curvature of the screen.

Another object is to provide a film projection system as described wherein the gate is adjustable in curvature for varying the curvature of the film at will to accommodate it to screens of different width curvature and to the use of different types of projection lenses.

Still another object is to provide an adjustable cylindrically curved gate to guide film in a curved position in a film projection system employing a correspondingly curved projection screen.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIG 3 is an enlarged perspective view of a film projection gate and part of a film strip according to the invention.

FIG. 4 is a further enlarged cross sectional view taken on line 4—4 of FIG. 3.

FIG. 5 is a fragmentary vertical sectional view taken on line 5—5 of FIG. 4.

FIG. 6 is a reduced front elevational view of a film projection gate and part of a film strip.

FIG. 7 is a front view similar to FIG. 6, showing the gate in an expanded position.

FIG. 8 is an enlarged sectional view similar to FIG. 4, taken on line 8—8 of FIG. 7.

FIG. 9 is an enlarged perspective view of the film projection gate in an open position.

FIG. 10 is a diagrammatic side view of part of a system embodying the invention.

FIG. 11 is an enlarged central sectional view through part of the film strip of FIG. 10, and FIG. 12 shows sectional views taken on lines A—A through H—H of FIG. 11.

Figure 1:
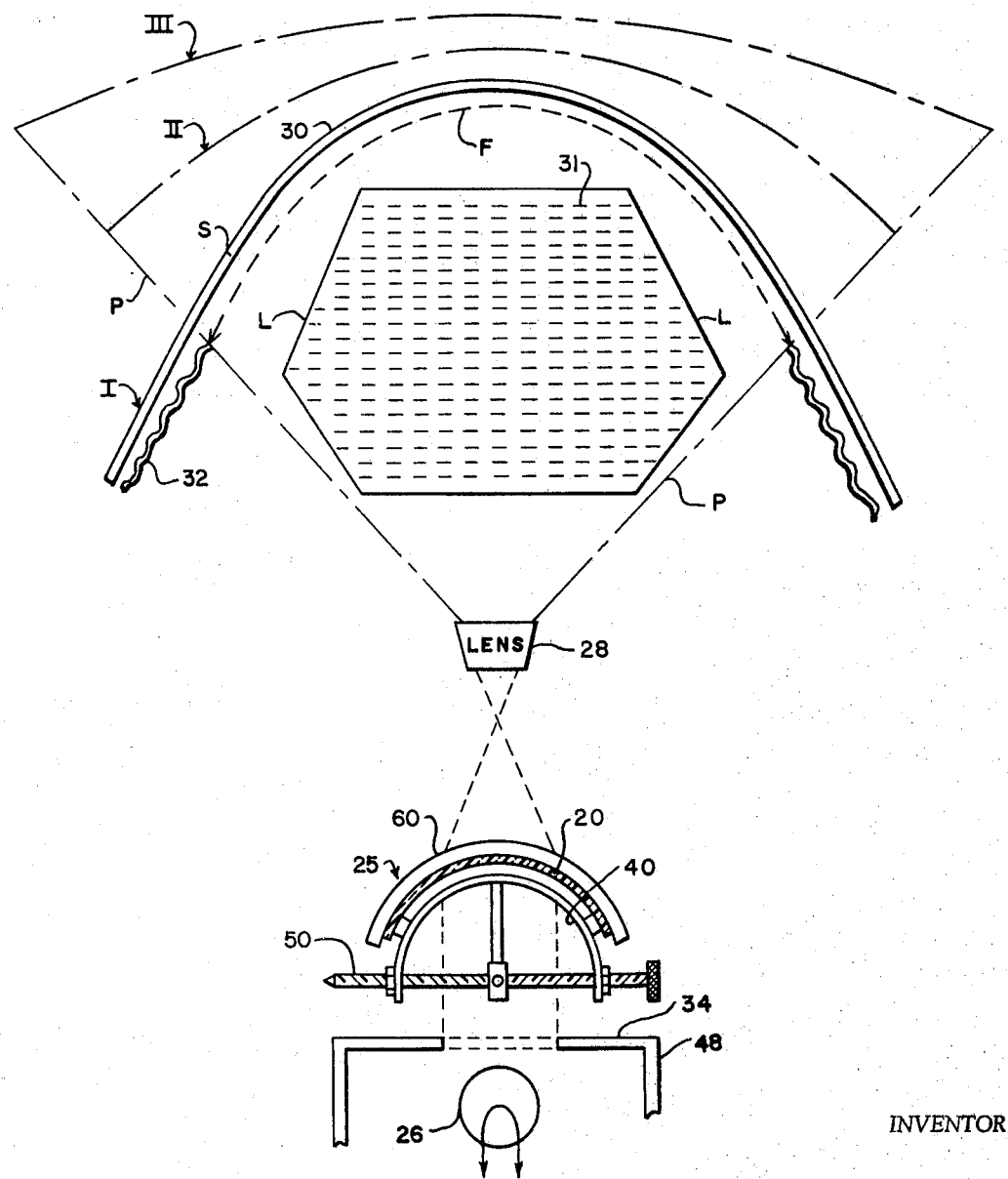
FIGURE 1 is a diagrammatic plan view of a system embodying the invention.
Figure 2:
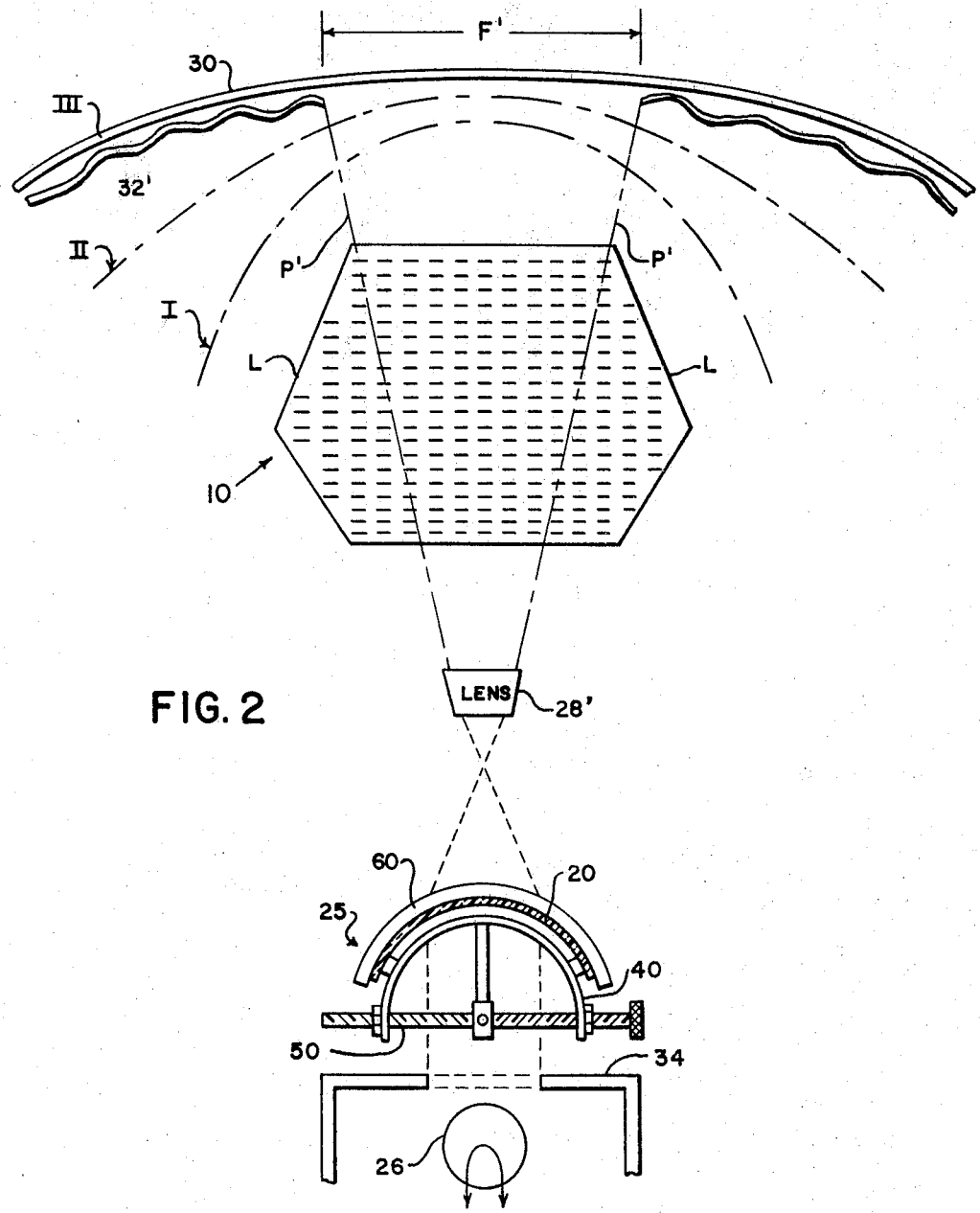
FIG. 2 is another diagrammatic plan view of the system of FIG. 1, used in explaining the invention.

Referring first to FIGS. 1 and 2, there is shown diagrammatically an auditorium 10. A film strip 20 extends vertically through a film projection gate 25. The film passes between lamp 26 and anamorphosing lens 28 to project an image on cylindrically curved axially vertical screen 30. The curved screen in solid line position I defines substantially a semicylinder. Sides S of the screen may be somewhat flattened so that the screen is rather parabolic in plan view to conform with corresponding straight lateral lines L of seats 31 in auditorium 10. Other possible curved configurations of screen 30 are indicated by dotted lines at positions II, and III where the screen has progressively larger radii of curvature, so that it is progressively more flattened. Curtains 32 are shown in withdrawn position at sides of the screen. The full field F of the screen extends about 180° defined between vertical images planes P. An adjustable aperture or iris or shutter 34 is located between the lamp and film. In FIG. 2 field F' is narrowed to define a narrower projection area on the screen 30 at position III, which is a more flattened position than position I or II. The gate 25 and film strip 20 are also more flattened than they are in FIG. 1. Lens 28 is replaced by non-amorphosing lens 28'. Curtains 32' are expanded to planes P at ends of field F'. The changes in configuration of the gate and film are accomplished by means shown to best advantage in FIGS. 3–9 to which reference is now made.

The film projection gate 25 has a flexible, thin back plate 40 provided with a rectangular aperture 42. The plate is generally rectangular in shape and is held in a vertical position by a horizontal rod 44 telescopically supported in a stationary sleeve 46 secured to lamp housing 48. Rod 44 is secured to the central vertical plane of the plate near the bottom thereof by a screw 49. Screw 43 holds the rod in a seat position in sleeve 46.

Plate 40 is held in a cylindrically curved axially vertical configuration by a horizontal, transversely extending screw shaft 50. Shaft 50 has one half 50' threaded in one direction and the other half 50'' threaded in an opposite direction. The shaft is engaged in screw holes 51 near upper corners of the plate. Locknuts 52 are provided on the shaft to lock the plate and shaft together in any position of adjustment of the shaft. The shaft has a knurled knob or head 55 to facilitate manual turning of the shaft. It will be apparent that when the shaft is turned in one direction the lateral edge 53a, 53b, of the plate are drawn closer to each other and when the shaft is turned in the opposite direction the edges 53a, 53b are moved further apart. Thus the plate changes in configuration from a smaller radius of curvature to a larger one as the edges of the plate move further apart and vice-versa. Correspondingly the plate is flattened more when the radius of curvature is larger than when the radius of curvature is smaller. Another horizontal support rod or arm 54 is attached to the lamp housing 48. This arm has an eye 57 at its forward end through which the shaft passes. The shaft has a centrally located circumferential slot 58 in which can engage a set screw 56 passed through eye 57. The screw 56 in cooperation with locknuts 52 insures that the shaft 50 will not turn once it is set in a particular position.

Near edge 53a and edge 53b two vertically spaced loops or eyes 59 are struck out to define hinge elements. These hinge elements are axially aligned and pivotally support a frame plate 60. Plate 60 serves as a retainer and guide for film 20. Plate 60 is generally rectangular with upper and lower edges 61, 62 turned slightly outward or forward to avoid scratching and scraping the film which moves vertically between the plates 40 and 60. Plate 60 has two vertically spaced loops or eyes 64 formed at the edge 65. These eyes are offset by flexible connecting strips 66 from edge 65. Eyes 64 are axially aligned with eyes 59 and receive hinge pins 68 so that plate 60 is hinged to plate 40 and can be turned thereon on a vertical axis. A rectangular aperture 70 is provided in plate 60, registering with edges of aperture 42. A single frame FR of film 20 will be exposed through the registering apertures when the plate 60 is closed with plate 40. A bent tongue 72 is struck out forwardly from plate 40 near edge 53a to serve as a spring catch element. This tongue engages with a bent finger 74 struck outwardly from a flexible arm 75 at edge 65a of plate 60. The cooperating tongues serve as a latch to hold the plate 60 in a curved configuration around and in front of plate 40. Plate 60 is thin and flexible and bends readily to conform with curved plate 40. Two downwardly and forwardly extending leaf springs 76 are secured to plate 40 by rivets 78 just beyond lateral edges of aperture 42. These springs serve to keep the frame FR of film 20 in sliding juxtaposition with the smooth rear side of plate 60, so that the film does not vibrate or flutter and is held taut while in the frame 25.

FIGS. 1, 3–6 show the gate 25 in contracted position so that the film 20 disposed between plates 40 and 60 is most sharply curved with minimum radius of curvature. The curvature of the film in cross section is substantially the same as that of screen 30 in position I. The lamp 26 in housing 48 projects an intense light beam through iris or shutter 34 and aligned apertures 42, 70 of plates 40, 60.

FIGS. 2, 7 and 8 show the gate 25 in expanded position so that the plates 40, 60 and film 20 at frame FR are all flattened in horizontal cross-section. It will be apparent that screws 43 and 46 and nuts 52 must be loosened to permit the shaft 50 to be turned in adjusting the gate from one curvature to another. The rod 44 will slide telescopically in sleeve 46 and then screw 43 will be tightened to fix the rod in position. Thereafter the nuts 52 and screws 43, 46 will be tightened. In its flattened form, the gate 25 holds the film somewhat flattened to conform to a screen or larger radius of curvature or more flattened configuration as shown in FIG. 2. Curtains 32' can be advanced inwardly toward each other so that the projection field F' is narrowed. Lens 28' may be a conventional non-amorphosing one for projecting conventional film having non-compressed images thereon.

FIGS. 10 to 12 illustrate the gradual change in curvature in horizontal cross section of film 20 between upper supply reel 80 and lower take up reel 82. About six film frames FR1–FR6 will in general be required to effect the transition between the flat film 20 at reel 80 and frame FR being exposed at gate 25. FIG. 11 and FIG. 12 clearly show the changes in cross section at sections B through G of six successive film frames FR1–FR6. Curvature increases gradually to frame FR and then decreases gradually in like manner to the flat film again at the sound pickup 81 or reel 82.

The invention thus provides means for curving film at a projection position to conform with curvature of a projection screen. The result is to impart a more truly realistic illusion of three dimensional quality to a wide screen picture cast on the curved screen. The ready adjustability of the gate 25 makes it possible to change curvature of the projected film frame to conform with different screen curvatures and with different widths of projection field on the screen. While the invention produces best results when used with an anamorphotic film print and an anamorphosing lens, the invention can be used for adapting conventional non-amorphotic films of any width for projection on curved screens of any width with prefect clarity and fine focus right out to the edges of the screens.

I claim:

1. A film supporting and guiding gate for a film in a curved, wide screen projection system, comprising a generally rectangular flexible plate having a first aperture for passing light therethrough, a second generally rectangular frame plate having a second aperture registering with said first aperture, hinge means pivoting the second frame to the first frame, quickly disengageable latch means holding said first second frame plate in substantial juxtaposition to the first plate, and means for adjustably supporting and curving said first plate in generally cylindrical configuration for curving the first frame plate and defining a curved channel between the juxtaposed frame plates to hold said film in corresponding cylindrically curved configuration.

2. A film supporting and guiding gate for a film in a curved, wide screen projection system as defined in claim 1, and spring means at one side of one frame plate in said channel extending to the other plate for holding said film in juxtaposition with the second plate.

3. A film supporting and guiding gate for a film in a curved, wide screen projection system, as defined in claim 1 wherein the means for adjustably supporting and curving said plate includes a shaft having one half thereof threaded in one direction and the other half threaded in opposite direction, said shaft extending transversely with opposite end portions engaged near lateral edges respectively of the first plate so that the first plate is held in generally cylindrical configuration, and whereby rotation of said shaft in either direction changes the cylindrical configuration of said first plate, said latch means holding said second frame plate so that it conforms in curved configuration to the first frame plate with a curved channel therebetween to hold said film in correspondingly curved configuration.

4. A film supporting and guiding gate for a film in a curved, wide screen projection system as defined in claim 3 and spring means at one side of one frame plate in said channel extending to the other plate for holding said film in juxtaposition with the second plate.

5. A film projection system, comprising a wide projection screen, said screen being generally cylindrically curved with respect to a first axis, a picture film, adjustable gate means supporting said film in a variable curved generally cylindrical configuration so that the curvature of the film can be conformed to the curvature of said screen with the axis of curvature of the film disposed parallel to said first axis, said picture being anamorphotic, and an anamorphosing projection lens interposed between said film and screen in an optical path including said film and screen for projecting an undistorted image of said picture on said screen, said adjustable gate means comprising a generally rectangular flexible plate having a first aperture for passing light therethrough, a second generally rectangular frame plate having a second aperture registering with said first aperture, hinge means pivoting the second frame to the first frame, quickly disengageable latch means holding said first second frame plate in substantial juxtaposition to the first plate, and means for adjustably supporting and curving said first plate in generally cylindrical configuration for curving the first frame plate and defining a curved channel between the juxtaposed frame plates to hold said film in corresponding cylindrically curved configuration.

6. A film projection system, comprising a wide projection screen, as defined in claim 5, and spring means at one side of one frame plate in said channel extending to the other plate for holding said film in juxtaposition with the second plate.

7. A film strip projection system as defined in claim 5 and quickly disengageable latch means holding said first second frame plate in substantially juxtaposition to the first plate, and means for adjustably supporting and curving said first plate in generally cylindrical configuration for curving the first frame plate and defining a curved channel between the juxtaposed frame plates to hold said film in corresponding cylindrically curved configuration.

References Cited

UNITED STATES PATENTS

| 1,136,236 | 4/1915 | Killman | 352—70 |
| 1,911,320 | 5/1933 | Le Barbier | 352—228 |
| 1,991,870 | 2/1935 | Schulz | 352—228 |
| 2,598,364 | 5/1952 | D'Avitaya | 352—228 |
| 2,857,805 | 10/1958 | O'Brien. | |
| 2,981,146 | 4/1961 | Kipping | 352—228 |
| 3,051,039 | 8/1962 | Wight. | |

JULIA E. COINER, Primary Examiner

U.S. Cl. X.R.

352—86, 228